US011702989B2

United States Patent
Lokhandwalla et al.

(10) Patent No.: US 11,702,989 B2
(45) Date of Patent: Jul. 18, 2023

(54) LAST CHANCE SCREEN FOR AIRCRAFT FUEL SYSTEM

(71) Applicant: Hamilton Sundstrand Corporation, Charlotte, NC (US)

(72) Inventors: Murtuza Lokhandwalla, South Windsor, CT (US); Leo J. Veilleux, Jr., Wethersfield, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 17/484,776

(22) Filed: Sep. 24, 2021

(65) Prior Publication Data
US 2023/0098079 A1     Mar. 30, 2023

(51) Int. Cl.
*F02C 7/22*     (2006.01)
*F02C 7/224*     (2006.01)

(52) U.S. Cl.
CPC .............. *F02C 7/222* (2013.01); *F02C 7/224* (2013.01); *F05D 2250/323* (2013.01); *F05D 2260/20* (2013.01); *F05D 2260/607* (2013.01); *F05D 2300/432* (2013.01); *F05D 2300/611* (2013.01)

(58) Field of Classification Search
CPC .............. B01D 2201/184; B01D 29/03; B01D 2239/0478; B01D 2239/1216; B01D 35/005; B01D 29/012; F02C 7/22; F02C 7/14; F02C 7/222; F02C 7/224
See application file for complete search history.

(56) References Cited

U.S. PATENT DOCUMENTS

| | | | |
|---|---|---|---|
| 9,149,742 B1 * | 10/2015 | Nehlen, III | F28F 9/0221 |
| 9,381,452 B2 * | 7/2016 | Elder | B01D 29/03 |
| 10,112,725 B2 | 10/2018 | Fausett et al. | |
| 10,495,002 B2 | 12/2019 | Cordatos et al. | |
| 2011/0309013 A1 * | 12/2011 | Elder | F02C 7/22 210/456 |
| 2015/0251114 A1 * | 9/2015 | Carpenter | B01D 29/01 210/131 |
| 2018/0001236 A1 * | 1/2018 | Marchione | B33Y 10/00 |
| 2018/0016986 A1 * | 1/2018 | Cordatos | B01D 35/005 |
| 2018/0078881 A1 | 3/2018 | Suzuki et al. | |
| 2018/0215478 A1 | 8/2018 | Iglewski et al. | |

FOREIGN PATENT DOCUMENTS

| | | | | |
|---|---|---|---|---|
| EP | 3269962 A1 * | 1/2018 | | B01D 29/0095 |
| GB | 2481286 A * | 12/2011 | | B01D 29/03 |
| KR | 20210039748 A | 4/2021 | | |
| WO | WO-0151176 A1 * | 7/2001 | | B01D 46/002 |

OTHER PUBLICATIONS

Jiang, Hua, et al., "Effects of Flow Passage Expansion or Contraction on Jet-Fuel Surface Deposition", Journal of Propulsion and Power, vol. 28, No. 4, Jul.-Aug. 2012, 694-706.
Extended European Search Report for EP Application No. 22197770.5, dated Feb. 20, 2023, 7 pages.

* cited by examiner

*Primary Examiner* — Craig Kim
(74) *Attorney, Agent, or Firm* — Kinney & Lange, P.A.

(57) ABSTRACT

A last chance screen for a fuel system includes a mesh that includes a first plurality of members extending in a first direction and a second plurality of members extending in a second direction and intersecting the first members. Openings are formed in the mesh between the first plurality of members and the second plurality of members. The first plurality of members and the second plurality of members have an airfoil shaped cross-section.

20 Claims, 5 Drawing Sheets

LAST CHANCE SCREEN FOR AIRCRAFT FUEL SYSTEM

BACKGROUND

The present disclosure relates to aircraft fuel systems, and in particular, to a last chance screen for aircraft fuel systems.

Fuel systems are included in aircraft to provide fuel to combustors of gas turbine aircraft engines. Fuel systems include fuel tanks and fuel processing systems that are configured to condition and meter the fuel flow to the combustor of the aircraft engines. A last chance screen can be positioned in a fuel conduit extending from the fuel tank and fuel processing system to the aircraft engine. The last chance screen is configured to filter particles out of the fuel to prevent the particles from flowing into the aircraft engine and clogging components in the aircraft engine, such as fuel nozzles configured to spray the fuel into the combustor.

Current designs for last chance screens include wires that are woven together to form a mesh. The fuel flows through openings in the mesh that are sized to filter particles out of the fuel. However, current last chance screens are highly susceptible to coking, where insoluble deposits accumulate on the surfaces of the last chance screens and cause clogging of the last chance screen. When the last chance screens are clogged, there is a pressure drop across the last chance screens, which can impact the efficiency of the aircraft engine positioned downstream of the last chance screen. Further, the deposits that accumulate on the surface of the last chance screens can shear off and flow downstream into the aircraft engine and cause clogging of components in the aircraft engine, such as the fuel nozzles. As the temperature of the fuel flowing through the last chance screen increases, the more susceptible the last chance screen is to coking.

SUMMARY

A last chance screen for a fuel system includes a mesh that includes a first plurality of members extending in a first direction and a second plurality of members extending in a second direction and intersecting the first members. Openings are formed in the mesh between the first plurality of members and the second plurality of members. The first plurality of members and the second plurality of members have an airfoil shaped cross-section.

A fuel system includes a fuel tank that is configured to contain fuel, a fuel nozzle fluidly coupled to the fuel tank, and a last chance screen positioned between the fuel tank and the fuel nozzle in a fuel conduit fluidly coupled to the fuel tank and the fuel nozzle. The last chance screen for a fuel system includes a mesh that includes a first plurality of members extending in a first direction and a second plurality of members extending in a second direction and intersecting the first members. Openings are formed in the mesh between the first plurality of members and the second plurality of members. The first plurality of members and the second plurality of members have an airfoil shaped cross-section.

DETAILED DESCRIPTION

Figure 1:
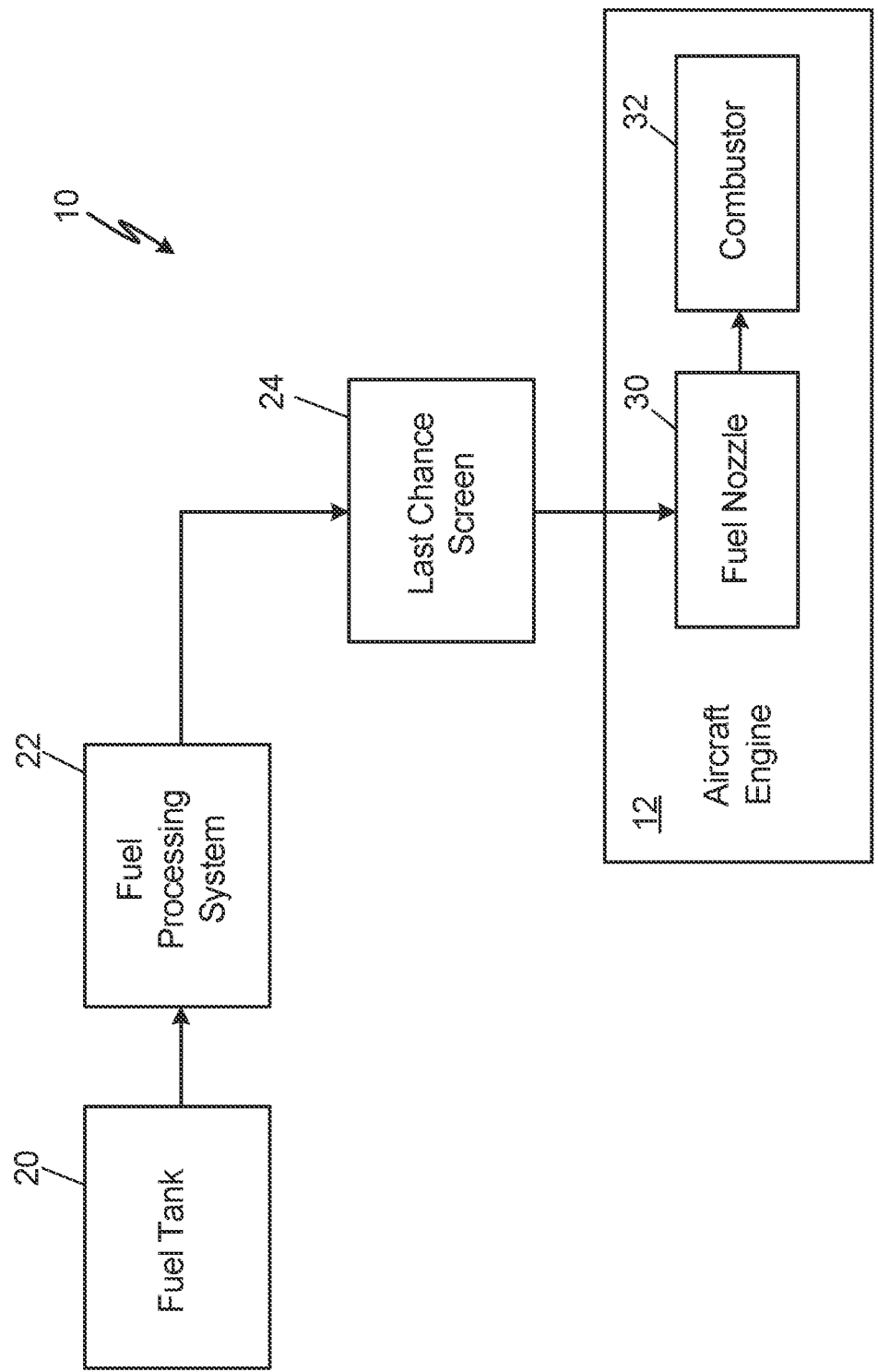
FIG. 1 is a block diagram of a fuel system for an aircraft engine.

FIG. 1 is a block diagram of fuel system 10 for aircraft engine 12. FIG. 1 shows fuel system 10 and aircraft engine 12. Fuel system 10 includes fuel tank 20, fuel processing system 22, and last chance screen 24. Aircraft engine 12 includes fuel nozzle 30 and combustor 32.

Fuel system 10 is configured to store, condition, and deliver fuel to aircraft engine 12. Fuel system 10 includes fuel tank 20 that stores fuel for use in aircraft engine 12. Fuel tank 20 can be positioned in any suitable location on an aircraft. Fuel tank 20 is fluidly coupled to fuel processing system 22 using a fuel conduit. Fuel flows from fuel tank 20 to fuel processing system 22, which is configured to condition and meter the fuel flow. Conditioning the fuel can include adjusting the pressure and temperature of the fuel and filtering the fuel. Last chance screen 24 is positioned in a fuel conduit extending between fuel processing system 22 and aircraft engine 12 and is fluidly coupled to fuel tank 20 and fuel processing system 22 that are upstream of last chance screen 24.

Aircraft engine 12 includes fuel nozzle 30 and combustor 32. Fuel nozzle 30 and combustor 32 are fluidly coupled to fuel system 10, including fuel tank 20, fuel processing system 22, and last chance screen 24. Fuel flows from fuel processing system 22 through last chance screen 24 to fuel nozzle 30, which sprays the fuel into combustor 32 for use by aircraft engine 12. One last chance screen 24 and one fuel nozzle 30 are shown in FIG. 1, but any suitable number of last chance screens 24 and fuel nozzles 30 can be included in alternate embodiments. At least one last chance screen 24 will be positioned in each fuel conduit leading to one fuel nozzle 30. In alternate embodiments, two or more last chance screens 24 can be positioned in each fuel conduit leading to one fuel nozzle 30. Further, last chance screens can be positioned between fuel tank 20 and fuel processing system 22 in some embodiments.

Fuel nozzle 30 has small and intricate passages and orifices that are designed to obtain the desired degree of fuel distribution and atomization in combustor 32. Debris and contaminant particles can be generated in fuel system 10. Last chance screen 24 is designed to filter the debris and contaminant particles out of the fuel prior to the fuel being delivered to fuel nozzle 30. This will prevent the debris and contaminant particles from clogging the passages and orifices of fuel nozzle 30.

Figure 2A:
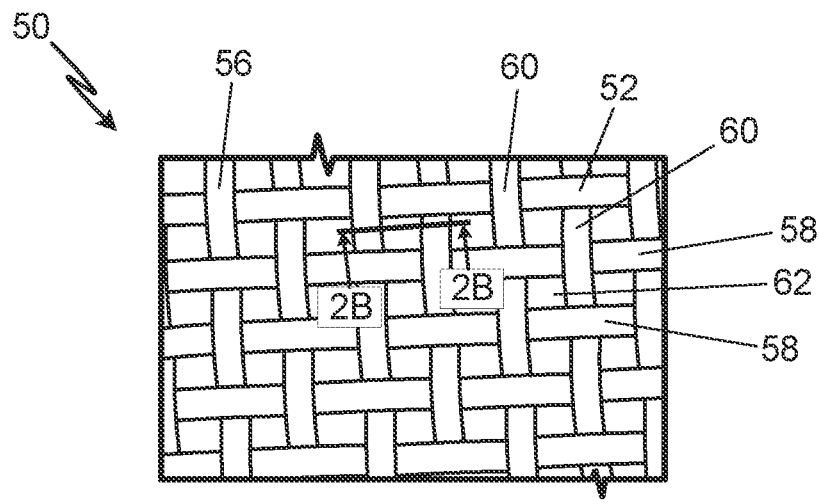
FIG. 2A is a top plan view of a prior art last chance screen.
Figure 2B:
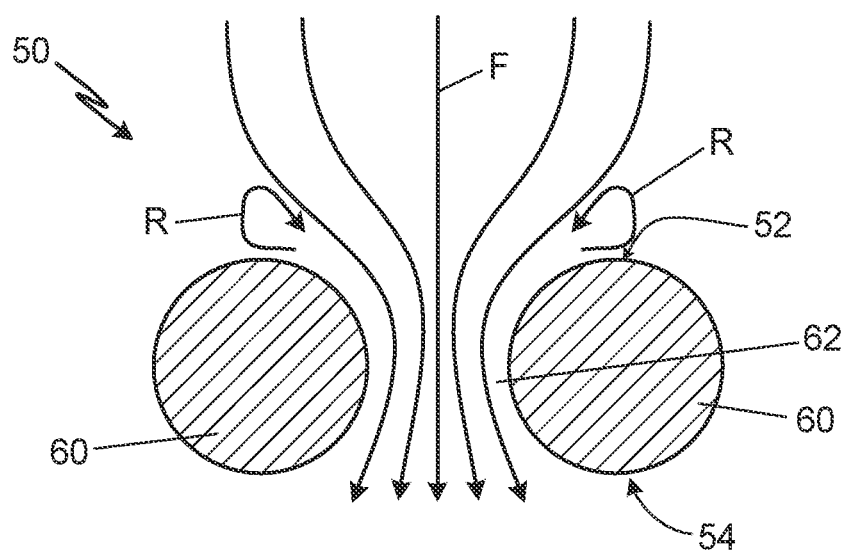
FIG. 2B is a cross-sectional view of the prior art last chance screen taken along line 2B-2B of FIG. 2A.
Figure 3A:
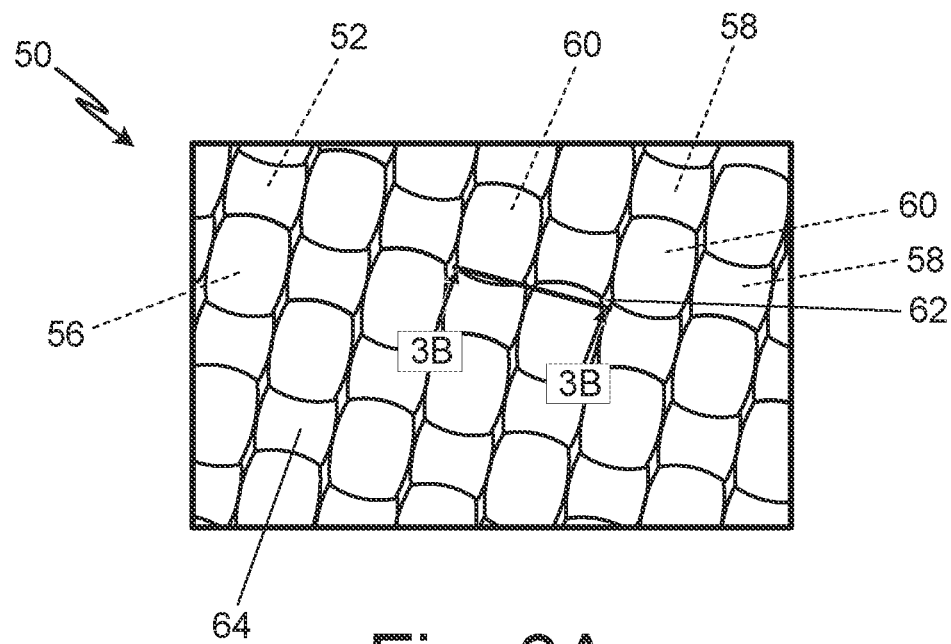
FIG. 3A is a top plan view of the prior art last chance screen with deposits.
Figure 3B:
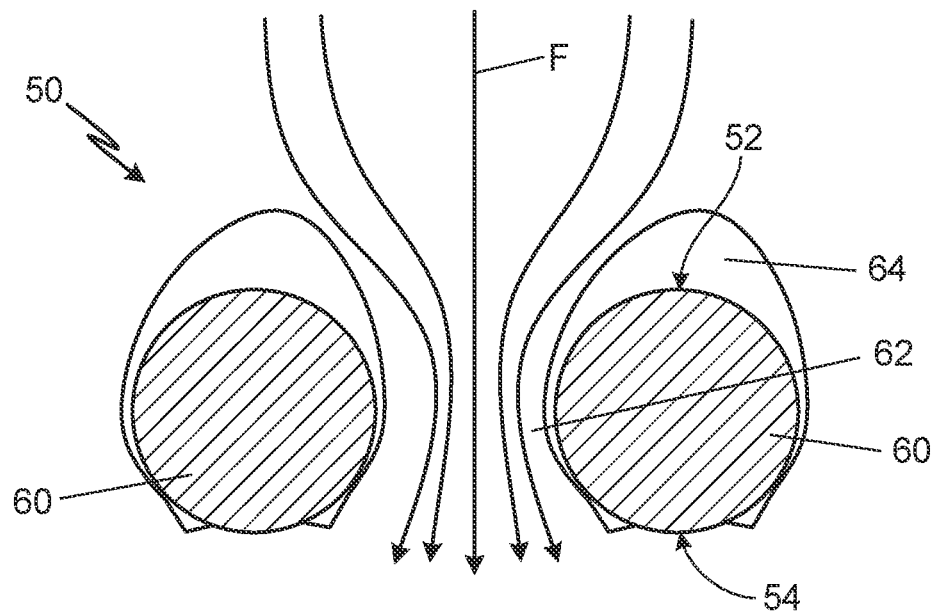
FIG. 3B is a cross-sectional view of the prior art last chance screen with deposits taken along line 3B-3B of FIG. 3A.
Figure 4A:
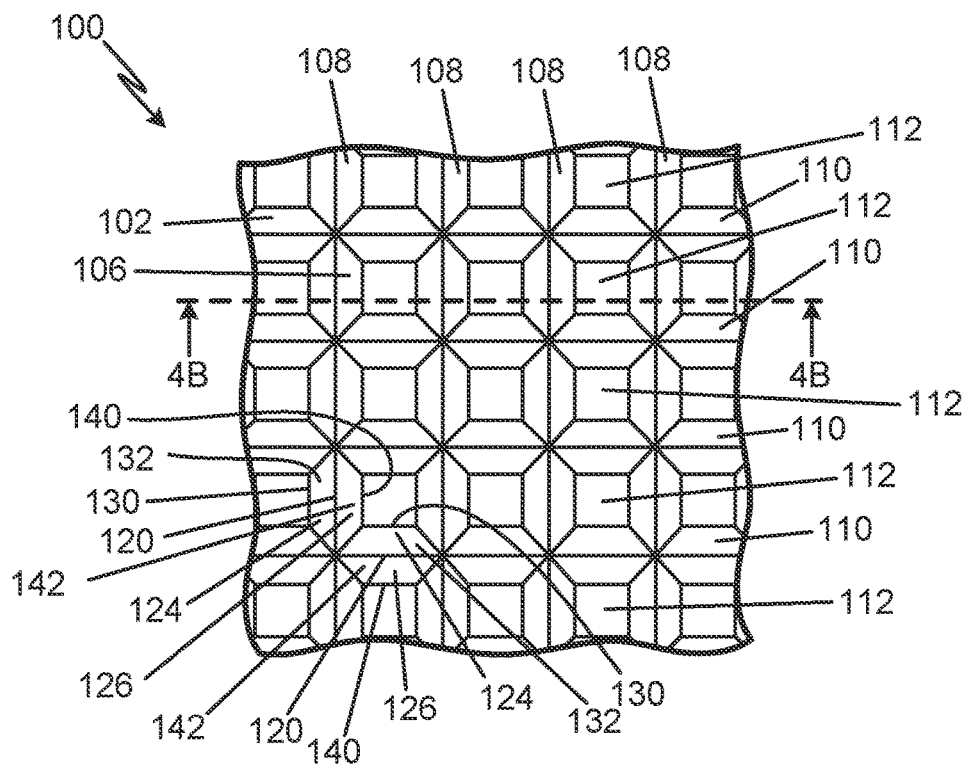
FIG. 4A is a top plan view of a first embodiment of a last chance screen.
Figure 4B:
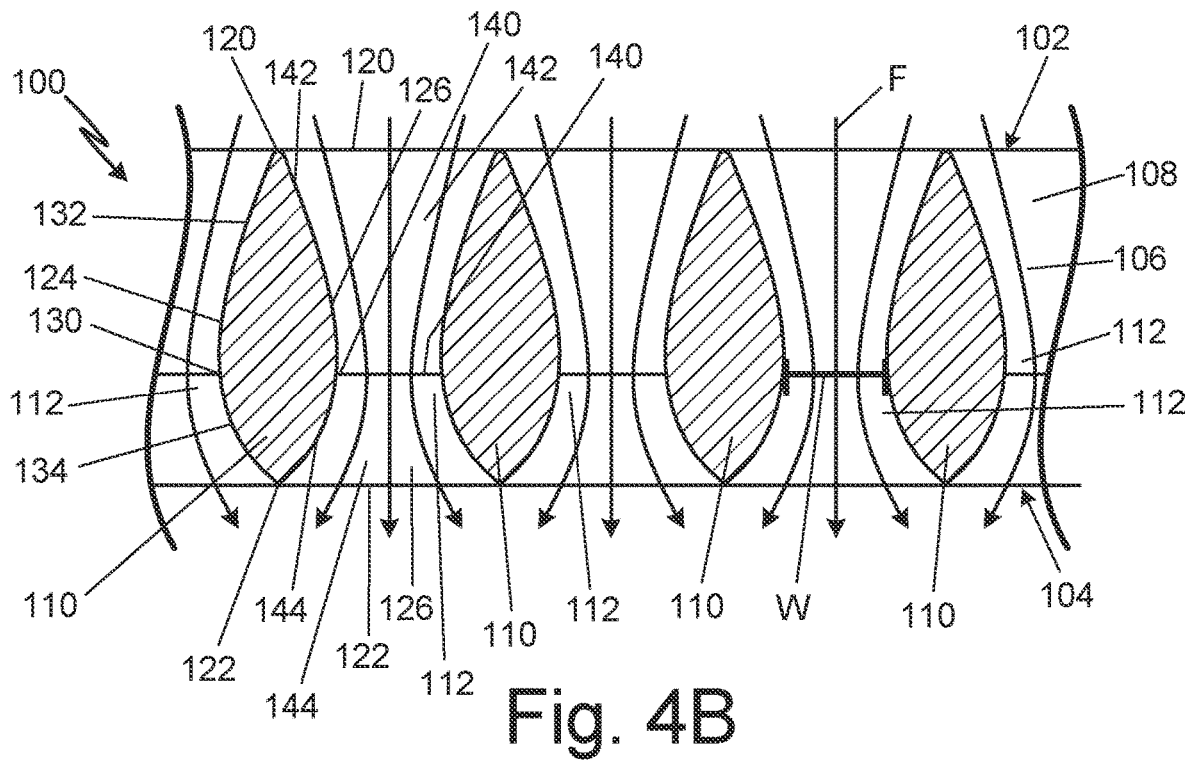
FIG. 4B is a cross-sectional view of the first embodiment of the last chance screen taken along line 4B-4B of FIG. 4A.

FIGS. 2A-3B will discuss a prior art last chance screen that is susceptible to clogging. FIGS. 4A-4B will discuss a last chance screen according to the present disclosure that is resistant to closing.

FIG. 2A is a top plan view of prior art last chance screen 50 taken along line 2B-2B of FIG. 2A. FIG. 2B is a cross-sectional view of prior art last chance screen 50. FIG. 3A is a top plan view of prior art last chance screen 50 with deposits 64. FIG. 3B is a cross-sectional view of prior art last chance screen 50 with deposits 64 taken along line 3B-3B of FIG. 3A. Last chance screen 50 includes upstream end 52, downstream end 54 (shown in FIGS. 2B and 3B), and wire mesh 56, which includes first wires 58 (shown in FIGS. 2A and 3A), second wires 60, and openings 62. FIGS. 3A-3B show deposits 64. FIGS. 2A-3B show flow arrows F. FIGS. 2A-2B show recirculation arrows R.

Last chance screen 50 is a prior art last chance screen that can be used in fuel system 10 (shown in FIG. 1). Last chance screen 50 has upstream end 52 and downstream end 54 opposite of upstream end 52. Last chance screen 50 is configured to be positioned in a fuel conduit between fuel processing system 22 (shown in FIG. 1) and fuel nozzle 30 (shown in FIG. 1). Upstream end 52 is configured to face fuel processing system 22, and downstream end 54 is configured to face fuel nozzle 30. Last chance screen 50 is configured to be positioned in the fuel conduit to filter the fuel flowing from fuel process system 22 to fuel nozzle 30. Fuel will flow through upstream end 52 and then out of downstream end 54 of last chance screen 50.

Last chance screen 50 includes wire mesh 56 having first wires 58 running in a first direction and second wires 60 running in a second direction that is perpendicular to the first direction. First wires 58 and second wires 60 are woven together to form wire mesh 56, as shown in FIG. 2A. First wires 58 and second wires 60 are traditional wires having circular cross-sections. Openings 62 are formed in wire mesh 56 between first wires 58 and second wires 60. The fuel will flow through openings 62 of last chance screen 50. The width of openings 62 is selected based on the particles to be filtered out of the fuel.

FIG. 2B shows a portion of last chance screen 50 that includes cross-sections through two second wires 60 and one opening 62 between second wires 60. FIG. 2B shows fuel flowing through openings 62 with flow arrows F. The fuel that is flowing towards opening 62, represented by the center flow arrow F, will flow straight through opening 62. The fuel that is flowing towards edges of second wires 60 will curve inwards around second wires 60 to flow through opening 62. Recirculation zones are formed at upstream surfaces of second wires 60, shown with recirculation arrows R. Recirculation zones are areas where the fuel flows into the upstream surfaces of second wires 60 and recirculates at the upstream surfaces of second wires 60, as shown with recirculation arrows R. Recirculation zones are also formed at upstream surfaces of first wires 58 (not shown in FIGS. 2A-2B). Recirculation zones are also formed at downstream surfaces of first wires 58 and second wires 60.

The recirculation zones are areas where the fuel becomes stagnant as it recirculates at the upstream surfaces and/or downstream surfaces of first wires 58 and second wires 60. The stagnant recirculation zones increase the local residence time that the fuel is at the upstream surfaces and/or downstream surfaces of first wires 58 and second wires 60. The stagnant recirculation zones reduce wall shear stress at the upstream surfaces and/or downstream surfaces of first wires 58 and second wires 60, which allows deposits 64 to be deposited and adhered onto the upstream surfaces and/or downstream surfaces of first wires 58 and second wires 60, as shown in FIGS. 3A-3B. FIG. 3B shows a portion of last chance screen 50 that includes cross-sections through two second wires 60, one opening 62 between second wires 60, and deposits 64 on upstream surfaces, sides, and portions of the downstream surfaces of second wires 60. FIG. 3B shows fuel flowing through openings 62 with flow arrows F. As shown in FIGS. 3A-3B, deposits 64 that form on first wires 58 and second wires 60 block openings 62 in last chance screen 50. The blockage of openings 62 results in a pressure drop across last chance 50 or even a complete blockage of fuel through last chance screen 50.

The accumulation of deposits 64 on last chance screen 50, as shown in FIGS. 3A-3B, is commonly referred to as coking of last chance screen 50. Coking occurs when the fuel in the stagnant recirculation zones settles deposits 64 on last chance screen 50. Deposits 64 are typically insoluble carbonaceous deposits. The presence of radicals (highly reactive species that tend to react with other species) in the fuel reacts with oxygen dissolved in the fuel to form the insoluble carbonaceous deposits. As the fuel recirculates at the upstream surfaces and/or downstream surfaces of first wires 58 and second wires 60, deposits 64 can settle onto first wires 58 and second wires 60. This causes coking of last chance screen 50.

Coking is accelerated when the fuel is at higher temperatures, specifically temperatures over 300 degrees Fahrenheit (149 degrees Celsius). As the temperature of the fuel increases, last chance screen 50 is more susceptible to coking due to the increased formation of deposits 64 in the fuel. However, with increased cooling demands on aircrafts and the drive to improve aircraft engine efficiency, there is a desire to increase fuel temperatures over 300 degrees Fahrenheit (149 degrees Celsius). Further, the recirculating flow at the upstream surfaces and/or downstream surfaces of first wires 58 and second wires 60 can shear off deposits 64 that have formed on last chance screen 50. The broken off deposits 64 can then flow downstream into fuel nozzle 22 of aircraft engine 12 (shown in FIG. 1) and cause clogging of the orifices and passages of fuel nozzle 22. Solutions are needed to decrease or eliminate coking on last chance screens used in fuel system 10 (shown in FIG. 1).

FIG. 4A is a top plan view of last chance screen 100. FIG. 4B is a cross-sectional view of last chance screen 100 taken along line 4B-4B of FIG. 4A. Last chance screen 100 includes upstream end 102, downstream end 104 (shown in FIG. 4B), and mesh 106, which includes first members 108, second members 110, and openings 112. Each member of first members 108 and second members 110 have leading edge 120, trailing edge 122 (shown in FIG. 4B), first side 124, and second side 126. First side 124 includes first outermost edge 130, first leading contoured surface 132, and first trailing contoured surface 134. Second side 126 includes second outermost edge 140, second leading contoured surface 142, and second trailing contoured surface 144. FIG. 4B shows flow arrows F and width W.

Last chance screen 100 is a last chance screen according to the present disclosure that can be used in fuel system 10 (shown in FIG. 1). Last chance screen 100 has upstream end 102 and downstream end 104 opposite of upstream end 102. Last chance screen 100 is configured to be positioned in a fuel conduit between fuel processing system 22 (shown in FIG. 1) and fuel nozzle 30 (shown in FIG. 1). Upstream end 102 is configured to face fuel processing system 22, and downstream end 104 is configured to face fuel nozzle 30. Last chance screen 100 is configured to be positioned in the fuel conduit to filter the fuel flowing from fuel process system 22 to fuel nozzle 30. Fuel will flow through upstream end 102 and then out of downstream end 104 of last chance screen 100.

Last chance screen 10 includes mesh 106 having first members 108 running in a first direction and second members 110 running in a second direction and intersecting first members 108. In the embodiment shown in FIGS. 4A-4B, the second direction is perpendicular to the first direction.

First members 108 and second members 110 intersect one another to form mesh 106, as shown in FIG. 4A. First members 108 and second members 110 have airfoil shaped cross-sections. Openings 112 are formed in mesh 106 between first members 108 and second members 110. As shown in FIGS. 4A-4B, openings 112 are square shaped. In alternate embodiments, openings 112 can be circular, rectangular, elliptical, or any other suitable shape.

As shown in FIG. 4B, first members 108 and second members 110 have airfoil shaped cross-sections. Each member of first members 108 and second members 110 have leading edge 120 at upstream end 102 of last chance screen 100 and trailing edge 122 at downstream end 104 of last chance screen 100. First side 124 extends from leading edge 120 to trailing edge 122, and second side 126 is opposite of first side 124 and extends from leading edge 120 to trailing edge 122. First side 124 has first outermost edge 130 between leading edge 120 and trailing edge 122 that is the outermost edge of first side 124 of second member 110. First leading contoured surface 132 extends between leading edge 120 and first outermost edge 130 on first side 124, and first trailing contoured surface 134 extends between first outermost edge 130 and trailing edge 122 on first side 124. First outermost edge 130 is positioned downstream of a central axis of each member of first members 108 and second members 110. First leading contoured surface 132 has a greater length than first trailing contoured surface 134 in the embodiment shown in FIGS. 4A-4B. In alternate embodiments, first leading contoured surface 132 and first trailing contoured surface 134 can be the same length or first trailing contoured surface 134 can have a greater length than first leading contoured surface 132. Second side 126 has second outermost edge 140 between leading edge 120 and trailing edge 122 that is the outermost edge of second side 126 of second member 110. Second leading contoured surface 142 extends between leading edge 120 and second outermost edge 140 on second side 126, and second trailing contoured surface 144 extends between second outermost edge 140 and trailing edge 122 on second side 126. Second outermost edge 140 is positioned downstream of a central axis of each member of first members 108 and second members 110. Second leading contoured surface 142 has a greater length than second trailing contoured surface 144 in the embodiment shown in FIGS. 4A-4B. In alternate embodiments, second leading contoured surface 142 and second trailing contoured surface 144 can be the same length or second trailing contoured surface 144 can have a greater length than second leading contoured surface 142.

The airfoil shaped cross-section of first members 108 and second members 110 is a biconvex shaped cross-section. Leading edge 120 forms an upstream tip of the airfoil shaped cross-section, and trailing edge 122 forms a downstream tip of the airfoil shaped cross-section. First side 124 and second side 126 both bulge outwards to form convex shaped sides of the airfoil shaped cross-section.

The airfoil shaped cross-section of first members 108 and second members 110 creates converging nozzles and diverging nozzles on last chance screen 100. Each opening 112 of mesh 106 of last chance screen 100 is surrounded by two first members 108 and two second members 110. First side 124 of one first member 108, second side 126 of an adjacent first member 108, first side 124 of one second member 110, and second side 126 of an adjacent second member 110 surround each opening 112 in mesh 106 of last chance screen 100. First leading contoured surface 132 of the one first member 108, second leading contoured surface 142 of the adjacent first member 108, first leading contoured surface 132 of the one second member 110, and second leading contoured surface 142 of the adjacent second member 110 form a converging nozzle leading to the narrowest portion of opening 112. First trailing contoured surface 134 of the one first member 108, second trailing contoured surface 144 of the adjacent first member 108, first trailing contoured surface 134 of the one second member 110, and second trailing contoured surface 144 of the adjacent second member 110 form a diverging nozzle leading to the downstream end of opening 112. The converging nozzles formed by first leading contoured surfaces 132 and second leading contoured surfaces 142, and the diverging nozzles formed by first trailing contoured surfaces 134 and second trailing contoured surfaces 144 promote the streamlined flow of fuel from upstream side 102 to downstream side 104 of last chance screen 100.

FIG. 4B shows fuel flowing through openings 112 with flow arrows F. The fuel that is flowing straight towards opening 112, represented by the center flow arrow F, will flow straight through opening 112. The fuel that is flowing towards second members 110 curves inwards around second members 110 to flow through opening 112. First leading contoured surfaces 132 on first sides 124 and second leading contoured surfaces 142 on second sides 126 of first members 108 and second members 110 direct the flow of the fuel through opening 112. First trailing contoured surfaces 134 on first sides 124 and second trailing contoured surfaces 144 on second sides 126 direct the flow of fuel outwards as fuel exits last chance screen 100 at downstream end of last chance screen 100.

The airfoil shaped cross-sections of first members 108 and second members 110 reduces the number of surfaces that are normal to the flow of the fuel compared to prior art last chance screen 50 shown in FIGS. 2A-3B. Rather, first leading contoured surfaces 132 and second leading contoured surfaces 142 are tangential to the flow of fuel through last chance screen 100. This allows the upstream portions of first sides 124 and second sides 126 of first members 108 and second members 110 to be tangential to the flow of the fuel. This prevents recirculation zones from forming at the upstream surfaces and/or downstream surfaces of first members 108 and second members 110. The contour of first leading contoured surfaces 132 and second leading contoured surfaces 142 can be designed to direct the flow of fuel through openings 112 through last chance screen 100. Further, the contour of first trailing contoured surfaces 134 and second trailing contoured surfaces 136 can be designed to direct the flow of fuel from openings 112 outward into the fuel conduit on downstream end 104 of last chance screen 100.

Width W is shown in FIG. 4B. Width W is the width between first outermost edge 130 of a first member and second outermost edge 132 of an adjacent member. In a first embodiment, width W is about 0.00394 inches (0.1 millimeter). In alternate embodiments, width W can have any width that is suitable for filtering particles out of the fuel flowing through last chance screen 100. Specifically, width W can be selected based on the size of the particles needing filtering out of the fuel and/or the size of the passages and orifices on components downstream of last chance screen 100.

Last chance screen 100 can be formed with an additive manufacturing process, a machining process (such as a wire electrical discharge machining process), or a photo etching process. Last chance screen 100 is manufactured to form a monolithic unibody including first members 108 and second members 110. Last chance screen 100 can be made out of nickel-based alloys, nickel-chromium-based superalloys, aluminum-based alloys, steel, high strength plastic, nylon, or any other suitable material. Last chance screen 100 can be coated with polytetrafluoroethylene (PTFE). The polytetrafluoroethylene (PTFE) coating is configured to prevent deposits from accumulating on the surface of last chance screen 100.

The airfoil shaped cross-section of first members 108 and second members 110 reduces or eliminates coking of last chance screen 100. The airfoil shaped cross-section of first members 108 and second members 110 prevent stagnant recirculation zones from forming on upstream end 102 and downstream end 104 of last chance screen 100 to help prevent deposits from settling on last chance screen 100 Eliminating stagnant recirculation zones from forming on upstream end 102 and downstream end 104 of last chance screen 100 enables fuel at hotter temperatures, for examples temperatures of greater than 300 degrees Fahrenheit (149 degrees Celsius), to flow through last chance screen 100 without coking of last chance screen 100. This allows fuel processing system 22 of fuel system 10 (shown in FIG. 1) to increase the temperature of the fuel prior to delivering it to fuel nozzles 30 of aircraft engine 12 (shown in FIG. 1). This will improve the overall efficiency of aircraft engine 12, as less energy is needed to combust the fuel in combustor 32 (shown in FIG. 1).

Preventing coking of last chance screen 100 allows fuel to flow through last chance screen 100 reduces the pressure drop across last chance screen 100. Reducing the pressure drop across last chance screen 100 reduces the work that fuel pumps in fuel system 10 have to do. Further, preventing coking of last chance screen 100 will extend the life of last chance screen 100, as deposits will not form on and clog last chance screen 100.

Figure 5A:
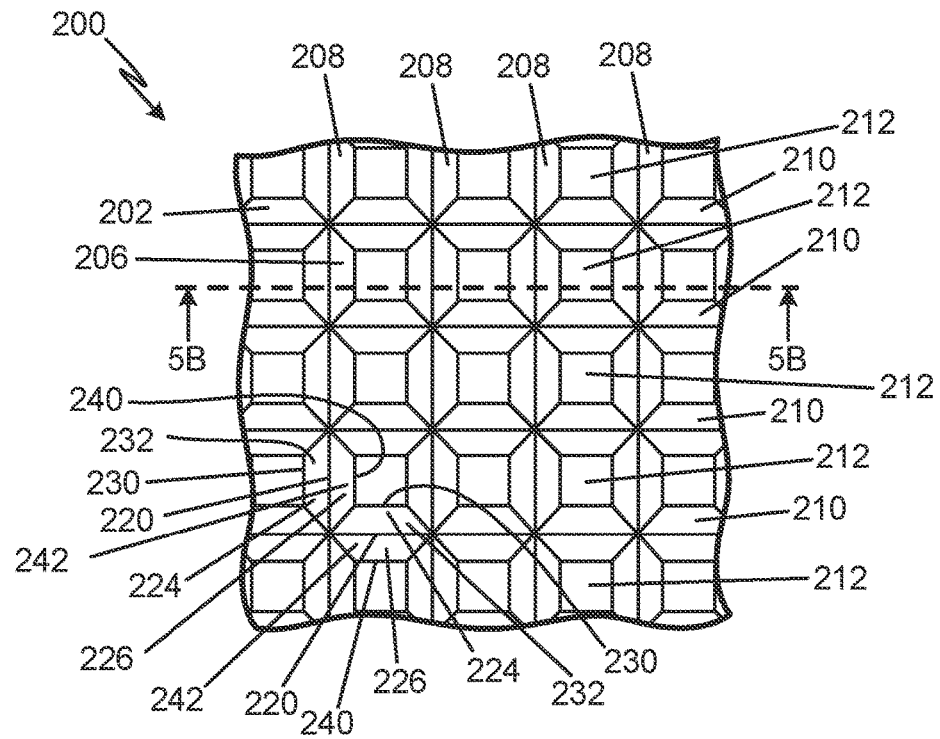
FIG. 5A is a top plan view of a second embodiment of a last chance screen.
Figure 5B:
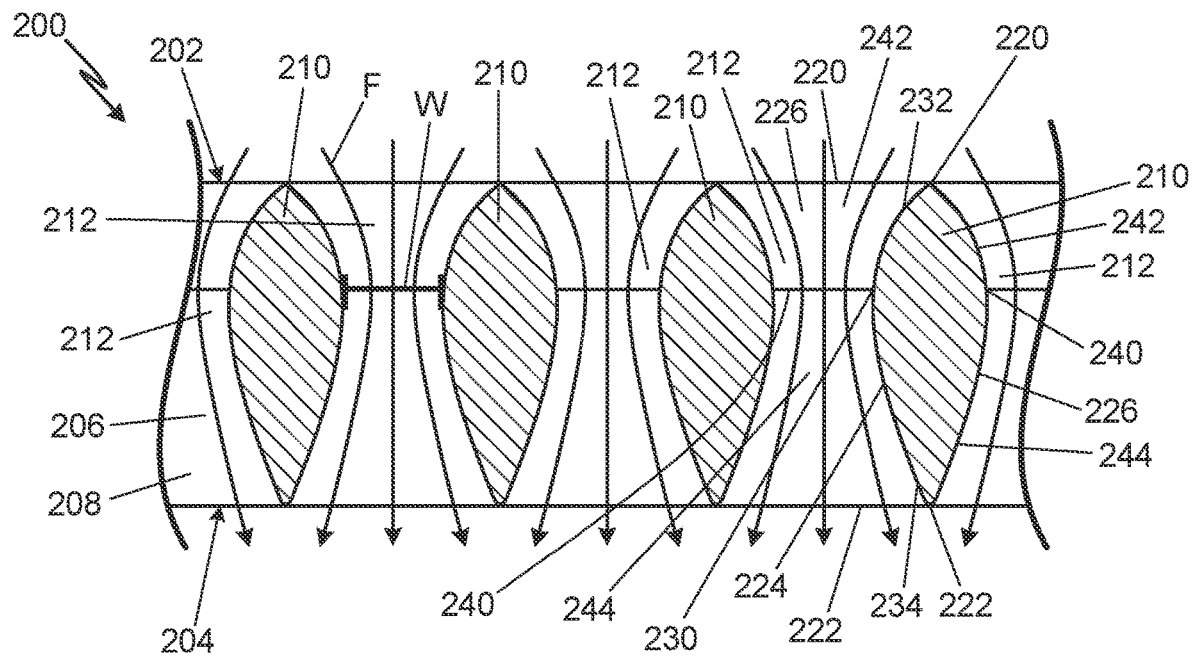
FIG. 5B is a cross-sectional view of the second embodiment of the last chance screen taken along line 5B-5B of FIG. 5A.

FIG. 5A is a top plan view of last chance screen 200. FIG. 5B is a cross-sectional view of last chance screen 200 taken along line 5B-5B of FIG. 5A. Last chance screen 200 includes upstream end 202, downstream end 204 (shown in FIG. 5B), and mesh 206, which includes first members 208, second members 210, and openings 212. Each member of first members 208 and second members 210 have leading edge 220, trailing edge 222 (shown in FIG. 5B), first side 224, and second side 226. First side 224 includes first outermost edge 230, first leading contoured surface 232, and first trailing contoured surface 234. Second side 226 includes second outermost edge 240, second leading contoured surface 242, and second trailing contoured surface 244. FIG. 5B shows flow arrows F and width W.

Last chance screen 200 is a last chance screen according to the present disclosure that can be used in fuel system 10 (shown in FIG. 1). Last chance screen 200 has the same general structure and design as last chance screen 100 shown in FIGS. 4A-4B. The reference numerals that refer to the parts of last chance screen 200 are incremented by one-hundred compared to the reference numerals that refer to the parts of last chance screen 100 shown in FIGS. 4A-4B.

As shown in FIG. 5B, last chance screen 200 has a reversed orientation compared to last chance screen 100 shown in FIGS. 4A-4B. As shown in FIG. 5B, first leading contoured surfaces 232 of last chance screen 200 has a smaller length than first trailing contoured surfaces 234, and second leading contoured surfaces 242 of last chance screen 200 has a smaller length than second trailing contoured surfaces 244. Adjacent first leading contoured surfaces 232 and second leading contoured surfaces 242 form converging nozzles in last chance screen 200, and adjacent first trailing contoured surfaces 234 and second trailing contoured surfaces 244 form diverging nozzles in last chance screen 200. In the embodiment shown in FIGS. 5A-5B, the converging nozzles have a smaller length than the diverging nozzles as first leading contoured surfaces 232 and second leading contoured surfaces 242 are smaller than first trailing contoured surfaces 234 and second trailing contoured surfaces 244.

Discussion of Possible Embodiments

The following are non-exclusive descriptions of possible embodiments of the present invention.

A last chance screen for a fuel system includes a mesh that includes a first plurality of members extending in a first direction and a second plurality of members extending in a second direction and intersecting the first members. Openings are formed in the mesh between the first plurality of members and the second plurality of members. The first plurality of members and the second plurality of members have an airfoil shaped cross-section.

The last chance screen of the preceding paragraph can optionally include, additionally and/or alternatively, any one or more of the following features, configurations and/or additional components:

Each member of the first plurality of members and the second plurality of members includes a leading edge at an upstream end of the last chance screen, a trailing edge at a downstream end of the last chance screen, a first side extending from the leading edge to the trailing edge, and a second side opposite of the first side and extending from the leading edge to the trailing edge.

Each member of the first plurality of members and the second plurality of members includes an upstream portion of the first side and an upstream portion of the second side that are tangential to a flow of fuel through the last chance screen.

Each member of the first plurality of members and the second plurality of members includes a first leading contoured surface extending from the leading edge to a first outermost edge on the first side, and a second leading contoured surface extending from the leading edge to a second outermost edge on the second side.

The first leading contoured surfaces and the second leading contoured surfaces of adjacent members form a converging nozzle.

Each member of the first plurality of members and the second plurality of members includes a first trailing contoured surface extending from the first outermost edge to the trailing edge on the first side, and a second trailing contoured surface extending from the second outermost edge to the trailing edge on the second side.

The first trailing contoured surfaces and the second trailing contoured surfaces form a diverging nozzle.

A width between a first outermost edge on the first side of a first member and a second outermost edge on the second side of an adjacent member is about 0.00394 inches (0.1 millimeter).

The last chance screen is formed with an additive manufacturing process, a member electrical discharge machining process, or a photo etching process.

The last chance screen comprises a material selected from the group consisting of nickel-based alloys, nickel-chromium-based superalloys, aluminum-based alloys, steel, high strength plastic, nylon, and combinations thereof.

The last chance screen is coated with polytetrafluoroethylene (PTFE).

A fuel system includes a fuel tank that is configured to contain fuel, a fuel nozzle fluidly coupled to the fuel tank, and a last chance screen positioned between the fuel tank and the fuel nozzle in a fuel conduit fluidly coupled to the fuel tank and the fuel nozzle. The last chance screen for a fuel system includes a mesh that includes a first plurality of members extending in a first direction and a second plurality of members extending in a second direction and intersecting the first members. Openings are formed in the mesh between the first plurality of members and the second plurality of members. The first plurality of members and the second plurality of members have an airfoil shaped cross-section.

The fuel system of the preceding paragraph can optionally include, additionally and/or alternatively, any one or more of the following features, configurations and/or additional components:

Each member of the first plurality of members and the second plurality of members includes a leading edge at an upstream end of the last chance screen, a trailing edge at a downstream end of the last chance screen, a first side extending from the leading edge to the trailing edge, and a second side opposite of the first side and extending from the leading edge to the trailing edge.

Each member of the first plurality of members and the second plurality of members includes an upstream portion of the first side and an upstream portion of the second side that are tangential to a flow of fuel through the last chance screen.

Each member of the first plurality of members and the second plurality of members includes a first leading contoured surface extending from the leading edge to a first outermost edge on the first side, and a second leading contoured surface extending from the leading edge to a second outermost edge on the second side.

The first leading contoured surface of a first member and the second leading contoured surface of an adjacent member form a converging nozzle.

Each member of the first plurality of members and the second plurality of members includes a first trailing contoured surface extending from the first outermost edge to the trailing edge on the first side, and a second trailing contoured surface extending from the second outermost edge to the trailing edge on the second side.

The first trailing contoured surface of a first member and the second trailing contoured surface of an adjacent member form a diverging nozzle.

A width between a first outermost edge on the first side of a first member and a second outermost edge on the second side of an adjacent member is about 0.00394 inches (0.1 millimeter).

The fuel system includes a fuel processing system positioned between the fuel tank and the last chance screen that is fluidly coupled to the fuel tank and the last chance screen, wherein the fuel processing system is configured to condition and meter the fuel.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A last chance screen for a fuel system, the last chance screen comprising:
   a mesh that comprises:
      a first plurality of members extending in a first direction;
      a second plurality of members extending in a second direction and intersecting the first members; and
      openings in the mesh formed between the first plurality of members and the second plurality of members;
   wherein each of the first plurality of members and each of the second plurality of members have biconvexly curved airfoil shaped cross-sections.

2. The last chance screen of claim 1, wherein each member of the first plurality of members and the second plurality of members comprises:
   a leading edge at an upstream end of the last chance screen;
   a trailing edge at a downstream end of the last chance screen;
   a first side extending from the leading edge to the trailing edge; and
   a second side opposite of the first side and extending from the leading edge to the trailing edge,
   wherein each of the first side and the second side is an outwardly bulging convex side.

3. The last chance screen of claim 2, wherein each member of the first plurality of members and the second plurality of members includes an upstream portion of the first side and an upstream portion of the second side that are tangential to a flow of fuel through the last chance screen.

4. The last chance screen of claim 2, wherein each member of the first plurality of members and the second plurality of members comprises:
   a first leading contoured surface extending from the leading edge to a first outermost edge on the first side; and
   a second leading contoured surface extending from the leading edge to a second outermost edge on the second side.

5. The last chance screen of claim 4, wherein the first leading contoured surfaces and the second leading contoured surfaces of adjacent members form a converging nozzle.

6. The last chance screen of claim 4, wherein each member of the first plurality of members and the second plurality of members comprises:
   a first trailing contoured surface extending from the first outermost edge to the trailing edge on the first side; and
   a second trailing contoured surface extending from the second outermost edge to the trailing edge on the second side.

7. The last chance screen of claim 6, wherein the first trailing contoured surfaces and the second trailing contoured surfaces form a diverging nozzle.

8. The last chance screen of claim 2, wherein a width between a first outermost edge on the first side of a first member and a second outermost edge on the second side of an adjacent member is about 0.00394 inches (0.1 millimeter).

9. The last chance screen of claim 1, wherein the last chance screen is formed with an additive manufacturing process, a member electrical discharge machining process, or a photo etching process.

10. The last chance screen of claim 1, wherein the last chance screen comprises a material selected from the group consisting of nickel-based alloys, nickel-chromium-based superalloys, aluminum-based alloys, steel, high strength plastic, nylon, and combinations thereof.

11. The last chance screen of claim 1, wherein the last chance screen is coated with polytetrafluoroethylene (PTFE).

12. A fuel system comprising:
a fuel tank that is configured to contain fuel;
a fuel nozzle fluidly coupled to the fuel tank; and
a last chance screen positioned between the fuel tank and the fuel nozzle in a fuel conduit fluidly coupled to the fuel tank and the fuel nozzle, wherein the last chance screen comprises:
a mesh that comprises:
a first plurality of members extending in a first direction
a second plurality of members extending in a second direction and intersecting the first members; and
openings in the mesh formed between the first plurality of members and the second plurality of members;
wherein each of the first plurality of members and each of the second plurality of members have biconvexly curved airfoil shaped cross-sections.

13. The fuel system of claim 12, wherein each member of the first plurality of members and the second plurality of members comprise:
a leading edge at an upstream end of the last chance screen;
a trailing edge at a downstream end of the last chance screen;
a first side extending from the leading edge to the trailing edge; and
a second side opposite of the first side and extending from the leading edge to the trailing edge,
wherein each of the first side and the second side is an outwardly bulging convex side.

14. The fuel system of claim 13, wherein each member of the first plurality of members and the second plurality of members includes an upstream portion of the first side and an upstream portion of the second side that are tangential to a flow of fuel through the last chance screen.

15. The fuel system of claim 13, wherein each member of the first plurality of members and the second plurality of members comprise:
a first leading contoured surface extending from the leading edge to a first outermost edge on the first side; and
a second leading contoured surface extending from the leading edge to a second outermost edge on the second side.

16. The fuel system of claim 15, wherein the first leading contoured surface of a first member and the second leading contoured surface of an adjacent member form a converging nozzle.

17. The fuel system of claim 15, wherein each member of the first plurality of members and the second plurality of members comprise:
a first trailing contoured surface extending from the first outermost edge to the trailing edge on the first side; and
a second trailing contoured surface extending from the second outermost edge to the trailing edge on the second side.

18. The fuel system of claim 17, wherein the first trailing contoured surface of a first member and the second trailing contoured surface of an adjacent member form a diverging nozzle.

19. The fuel system of claim 13, wherein a width between a first outermost edge on the first side of a first member and a second outermost edge on the second side of an adjacent member is about 0.00394 inches (0.1 millimeter).

20. The fuel system of claim 12, and further comprising:
a fuel processing system positioned between the fuel tank and the last chance screen that is fluidly coupled to the fuel tank and the last chance screen, wherein the fuel processing system is configured to condition and meter the fuel.

* * * * *